US009826170B2

United States Patent
Fukata et al.

(10) Patent No.: US 9,826,170 B2
(45) Date of Patent: Nov. 21, 2017

(54) IMAGE PROCESSING OF CAPTURED THREE-DIMENSIONAL IMAGES

(71) Applicant: Sony Corporation, Tokyo (JP)

(72) Inventors: Yoko Fukata, Tokyo (JP); Toshiki Ono, Tokyo (JP); Masanori Mikami, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 517 days.

(21) Appl. No.: 14/370,496

(22) PCT Filed: Nov. 7, 2012

(86) PCT No.: PCT/JP2012/078803
§ 371 (c)(1),
(2) Date: Jul. 3, 2014

(87) PCT Pub. No.: WO2013/111415
PCT Pub. Date: Aug. 1, 2013

(65) Prior Publication Data
US 2015/0002631 A1 Jan. 1, 2015

(30) Foreign Application Priority Data

Jan. 26, 2012 (JP) ................. 2012-013923

(51) Int. Cl.
H04N 13/00 (2006.01)
H04N 13/02 (2006.01)
H04N 5/262 (2006.01)
H04N 13/04 (2006.01)

(52) U.S. Cl.
CPC ....... H04N 5/2628 (2013.01); H04N 13/0203 (2013.01); H04N 13/0207 (2013.01); H04N 13/0452 (2013.01); H04N 2013/0081 (2013.01)

(58) Field of Classification Search
USPC ..................................... 348/46, 42
See application file for complete search history.

(56) References Cited

U.S. PATENT DOCUMENTS

| 2011/0069156 A1* | 3/2011 | Kurahashi | .......... G06K 9/00255 348/47 |
| 2012/0019528 A1* | 1/2012 | Ugawa | ................... G09G 3/003 345/419 |
| 2012/0069007 A1* | 3/2012 | Pegg | ................. G06K 9/00221 345/419 |

FOREIGN PATENT DOCUMENTS

| JP | 08-331607 | 12/1996 |
| JP | 09-037299 | 2/1997 |
| JP | 2009-094724 | 4/2009 |
| JP | 2009-218807 | 9/2009 |
| JP | 2010-103972 | 5/2010 |
| JP | 2011-071605 | 4/2011 |
| JP | 2011-101240 | 5/2011 |
| JP | 2011-119995 | 6/2011 |

* cited by examiner

Primary Examiner — Nigar Chowdhury
(74) Attorney, Agent, or Firm — Chip Law Group

(57) ABSTRACT

There is provided an image processing device including a first composition setting unit configured to set composition for a two-dimensionally displayed input image based on a first technique, and a second composition setting unit configured to set composition for a three-dimensionally displayed input image based on a second technique different from the first technique.

20 Claims, 8 Drawing Sheets

FIG. 5
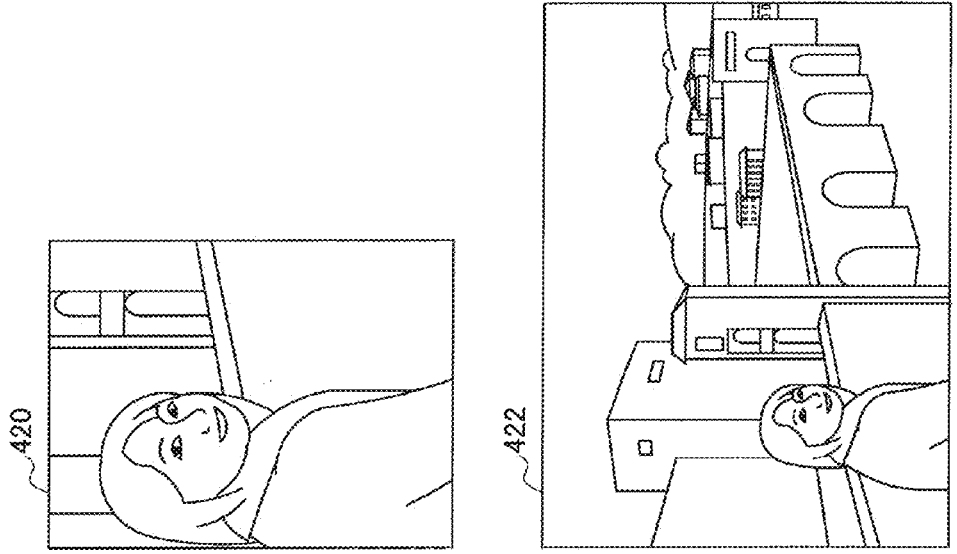
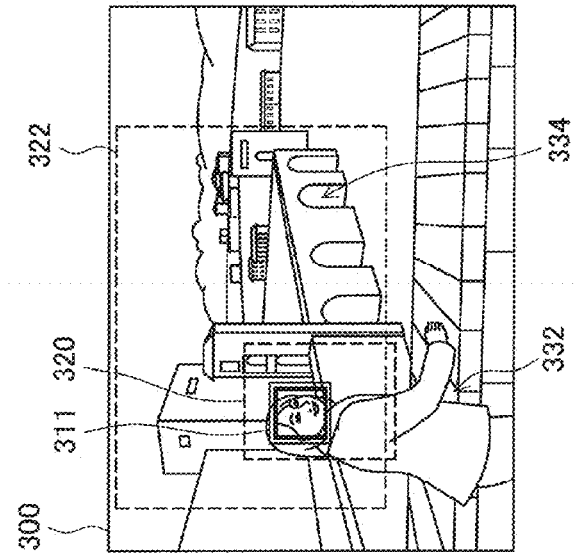

IMAGE PROCESSING OF CAPTURED THREE-DIMENSIONAL IMAGES

CROSS REFERENCES TO RELATED APPLICATIONS

The present invention is the National Stage of International Application No. PCT/JP2012/078803, filed on Nov. 7, 2012, which claims the priority benefit of Japanese Patent Application Number 2012-013923, filed in the Japanese Patent Office on Jan. 26, 2012.

TECHNICAL FIELD

The present disclosure relates to an image processing device and an image processing method.

BACKGROUND ART

In recent years, imaging devices such as digital still cameras that automatically adjust focus and exposure have been widely proliferated. In such imaging devices, for example, focus, exposure, and the like suitable for photographed scenes are set, so users can acquire satisfactorily captured images without directly adjusting them.

Furthermore, technologies for automatically setting composition of a captured image without manipulation of a user, for example, those disclosed in Patent Literature 1 and Patent Literature 2, have been proposed. In the technologies, for example, the size and position of the face of a subject are detected, and based on the information, an appropriate region in a captured image is cropped out as a trimmed image.

CITATION LIST

Patent Literature

Patent Literature 1: JP 2010-103972A
Patent Literature 2: JP 2009-218807A

SUMMARY OF INVENTION

Technical Problem

On the other hand, recently, imaging devices that can capture three-dimensional images are also gradually increasing. Since a three-dimensional image is observed with depth, elements that should be considered when setting composition of the image are not the same as those of a two-dimensional image at all times. The technologies disclosed in Patent Literature 1 and Patent Literature 2 described above only take two-dimensional images into consideration, and thus it is hard to say that the technologies realize a proper composition setting for three-dimensional images.

Therefore, the present disclosure proposes a novel and improved image processing device and image processing method that can realize a more proper composition setting in an imaging device that can capture three-dimensional images.

Solution to Problem

According to the present disclosure, there is provided an image processing device including a first composition setting unit configured to set composition for a two-dimensionally displayed input image based on a first technique, and a second composition setting unit configured to set composition for a three-dimensionally displayed input image based on a second technique different from the first technique.

According to the present disclosure, there is provided an image processing method including setting composition for a two-dimensionally displayed input image based on a first technique, and setting composition for a three-dimensionally displayed input image based on a second technique different from the first technique.

According to the present disclosure, there is provided an image processing device including a composition setting unit configured to set composition for a three-dimensionally displayed input image based on depth information indicating a depth of the input image.

According to the present disclosure, there is provided an image processing method including setting composition for a three-dimensionally displayed input image based on depth information indicating a depth of the input image.

According to the configuration described above, a composition setting process is executed for a three-dimensionally displayed input image, differently from a case of two-dimensional display. Thus, an element adaptive to a three-dimensional image can be reflected in a composition setting.

Advantageous Effects of Invention

As described above, according to the present disclosure, it is possible to realize a more proper composition setting in an imaging device that can capture three-dimensional images.

BRIEF DESCRIPTION OF DRAWINGS

FIG. 5 is a diagram for schematically describing two-dimensional and three-dimensional composition setting processes according to a second embodiment of the present disclosure.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Note that description will be provided in the following order.

1. First embodiment (Example of switching of a two-dimensional composition setting and a three-dimensional composition setting)
   1-1. Functional configuration
   1-2. Process flow
   1-3. Example of a three-dimensional composition setting process
2. Second embodiment (Example in which depth information and a depth of field are used)
3. Third embodiment (Example in which a range of depths is used)
4. Fourth embodiment (Example in which three-dimensional composition is mainly set)
5. Supplement In description below, first to fourth embodiments of the present disclosure relating to digital still cameras that are examples of an image processing device will be introduced. Note that the image processing device according to the embodiments of the present disclosure is not limited to a digital still camera, and can be various devices with a function of generating trimmed images by processing input images. In addition, the embodiments of the present disclosure also includes a method for generating trimmed images by processing input images, a program for causing a computer to realize the function of generating trimmed images by processing input images, and a computer-readable recording medium on which such a program is recorded.

1. First Embodiment (1-1. Functional Configuration)

Figure 1:
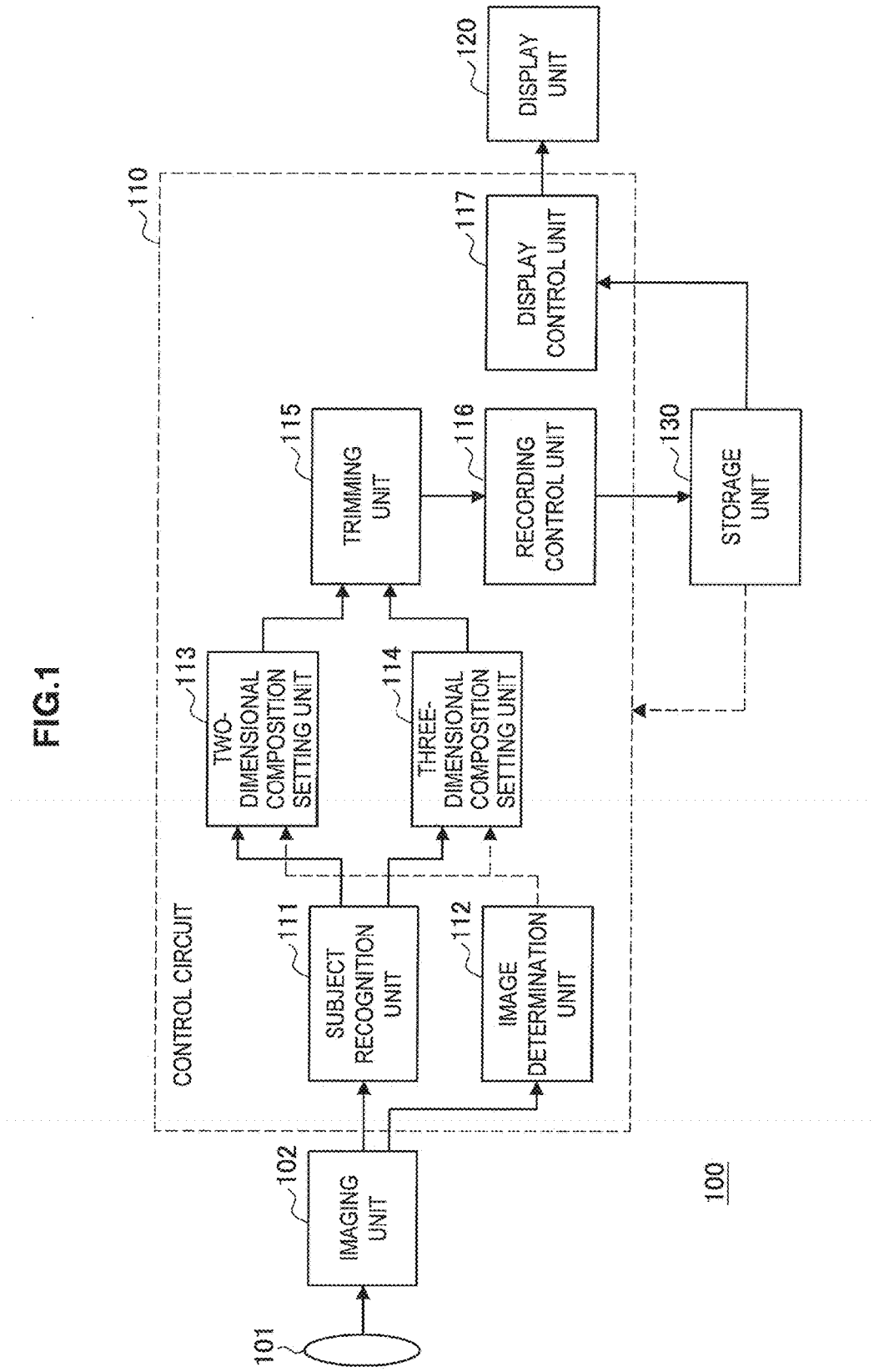
FIG. 1 is a block diagram schematically showing a functional configuration of a digital still camera according to a first embodiment of the present disclosure.

First, a functional configuration of a digital still camera according to a first embodiment of the present disclosure will be described with reference to FIG. 1. FIG. 1 is a schematic block diagram showing the functional configuration of the digital still camera 100 according to the present embodiment.

The digital still camera 100 includes an imaging optical system 101, an imaging unit 102, a control circuit 110, a display unit 120, and a storage unit 130. The control circuit 110 realizes functions of a subject recognition unit 111, an image determination unit 112, a two-dimensional composition setting unit 113, a three-dimensional composition setting unit 114, a trimming unit 115, a recording control unit 116, and a display control unit 117. Note that, in addition to the illustrated functional configuration, the digital still camera 100 can include a constituent element such as a manipulation unit that is generally provided in a digital still camera.

The imaging optical system 101 is constituted by various lenses including a focus lens, a zoom lens, and optical components of an optical filter, a diaphragm, and the like. An optical image (subject image) incident from a subject is formed on an exposure surface of an image sensor included in the imaging unit 102 via the optical components included in the imaging optical system 101.

The imaging unit 102 includes an image sensor, for example, a CCD (Charge Coupled Device) or a CMOS (Complementary Metal Oxide Semiconductor), a timing generator for driving the image sensor, and a signal processing circuit. The signal processing circuit processes an analog image signal output when the image sensor performs photoelectric conversion on a subject image, converts the signal into a digital image signal, and outputs the signal to the control circuit 110. The signal processing circuit is realized by, for example, a DSP (Digital Signal Processor).

(Regarding Two-Dimensional and Three-Dimensional Input Images)

Here, the imaging optical system 101 and the imaging unit 102 have a function of acquiring both of an input image that is two-dimensionally displayed (hereinafter referred to also as a two-dimensional input image) and an input image that is three-dimensionally displayed (hereinafter referred to also as a three-dimensional input image).

Here, the three-dimensional input image is obtained by adding depth information representing a depth of an image to information of a two-dimensional input image. The depth information is expressed with, for example, a right-eye image that corresponds to a left-eye image. In this case, the depth information is extracted based on parallax between the left-eye image and the right-eye image. When an image is reproduced, an observer is caused to perceive a depth when the left-eye image is presented to the left eye of the observer and the right-eye image is presented to the right eye of the observer, respectively.

In addition, the depth information may be information in which a depth of an image is expressed using, for example, a map, a numerical value, or the like. In this case, the depth information can be acquired by actually measuring a depth using, for example, a distance sensor during imaging. When an image is to be reproduced, a left-eye image and a right-eye image for which parallax according to the depth is set are generated using the depth information, and then the images are presented to an observer.

In order to acquire such a three-dimensional input image, for example, the imaging optical system 101 may be a binocular optical system that includes two pairs of lenses for left-eye images and right-eye images. In addition, the imaging optical system 101 may be a monocular optical system that includes an imager or the like that divides optical images acquired by one pair of lenses into a left-eye image and a right-eye image.

Note that the configuration of such an imaging system is disclosed in, for example, JP 2011-248693A and the like. For the imaging optical system 101 and the imaging unit 102, various known configurations can be used, beginning from the configuration described in the documents above.

As another example, the imaging optical system 101 and the imaging unit 102 may have the same configuration as a general imaging system that acquires two-dimensional input images. In this case, when the digital still camera 100 executes imaging while moving in the left and right directions, for example, the imaging unit 102 may be controlled such that a left-eye image and a right-eye image are acquired as three-dimensional input images.

The control circuit 110 realizes the functions of the subject recognition unit 111, the image determination unit 112, the two-dimensional composition setting unit 113, the three-dimensional composition setting unit 114, the trimming unit 115, the recording control unit 116, and the display control unit 117, and controls operations of each unit of the digital still camera 100. The control circuit 110 is realized by a CPU (Central Processing Unit) that realizes the above-mentioned functions through, for example, operations based on a program saved in the storage unit 130. Some or all of the functions of the control circuit 110 may be realized by a DSP in the same manner as the signal processing circuit described above. Hereinbelow, each of the functions realized by the control circuit 110 will be described.

The subject recognition unit 111 analyzes a digital image signal of an input image acquired from the imaging unit 102 and then recognizes a subject included in the image. Here, the subject is, for example, the face of a person. In addition to that, the subject can be various kinds of objects such as the face of an animal, a flower, or food. The subject recognition unit 111 computes the region of the subject using an algorithm or, for example, wavelet transform, Haar feather detection, or the like. If the region of the subject is, for example, the face of a person, the region can be coordinate values of a minimum rectangle that includes the chin, the ears, and the eyebrows. Note that the region of the subject may not necessarily be a rectangle, and may be a shape such as a triangle or an ellipse. Furthermore, the subject recognition unit 111 may recognize an orientation of the subject, in addition to the region of the subject.

The image determination unit 112 determines whether the input image acquired from the imaging unit 102 is a two-dimensional input image or a three-dimensional input image. This determination can be made based on, for example, whether or not the input image is accompanied with depth information. In this case, when the input image includes a right-eye image and a left-eye image, or when the input image is accompanied with data such as a map or a numeric value with regard to depth information, the image determination unit 112 determines that the input image is a three-dimensional input image.

Alternatively, the image determination unit 112 may execute the determination based on an operation mode set in the digital still camera 100 through manipulation of a user or the like. As an example of a configuration of the digital still camera 100, there is a case in which the imaging optical system 101 and the imaging unit 102 routinely acquire depth information. In this case, a two-dimensional imaging mode and a three-dimensional imaging mode are prepared as operation modes, and when the three-dimensional imaging mode is set, a trimmed image may be generated as a three-dimensional image.

In this case, even when the input image is accompanied with the depth information at the time of the determination made by the image determination unit 112, the input image is not limited to being three-dimensionally displayed. Thus, in such a case, the image determination unit 112 may determine whether the input image is a two-dimensional input image or a three-dimensional input image based on the operation mode set in the digital still camera 100. Note that the operation mode may be automatically set according to, for example, an imaging circumstance or according to manipulation of a user.

The image determination unit 112 controls the two-dimensional composition setting unit 113 and the three-dimensional composition setting unit 114 based on a result of the determination. To be more specific, the image determination unit 112 controls the units such that the two-dimensional composition setting unit 113 functions when the input image is a two-dimensional input image and the three-dimensional composition setting unit 114 functions when the input image is a three-dimensional image. Note that, when the digital still camera 100 is provided with an operation mode in which a same input image is recorded for both of two-dimensional display and three-dimensional display, the image determination unit 112 may cause both of the two-dimensional composition setting unit 113 and the three-dimensional composition setting unit 114 to function. In this case, the input image can be trimmed and recorded as images for respective two-dimensional display and three-dimensional display.

The two-dimensional composition setting unit 113 sets composition of the two-dimensional input image based on a first technique. The "setting of composition" referred to here may include setting of a trimmed region of an input image. The two-dimensional composition setting unit 113 sets a trimmed region such that, for example, the subject of the input image is arranged in thirds composition, halves composition, or the like. Here, elements used in setting composition by the two-dimensional composition setting unit 113 are, for example, the position, the size, the orientation, and the like of the subject recognized by the subject recognition unit 111. For example, the two-dimensional composition setting unit 113 decides a size of the trimmed region according to the size of the subject. In addition, the two-dimensional composition setting unit 113 decides the position in which the subject is placed according to the orientation of the subject. Furthermore, the two-dimensional composition setting unit 113 decides the trimmed region according to the decided placement of the subject. At this time, the two-dimensional composition setting unit 113 may adjust the trimmed region so that another subject is included in the periphery of the main subject that serves as a reference of composition setting. Note that the adjustment of the trimmed region referred to herein also includes changing the trimmed region to be horizontally long or vertically long, in addition to, for example, changing the size of the trimmed region. The two-dimensional composition setting unit 113 provides information of the set trimmed region to the trimming unit 115.

The three-dimensional composition setting unit 114 sets composition of the three-dimensional input image based on a second technique. The "setting composition" referred to here may include setting of a trimmed region of the input image. The three-dimensional composition setting unit 114 sets the trimmed region so that, for example, the subject of the input image is placed in thirds composition, halves composition, or the like in the same manner as the halves composition setting unit 113. However, the three-dimensional composition setting unit 114 uses, for example, depth information, information of a depth of field, and the like of the input image in composition setting, in addition to the position, the size, the orientation, and the like of the subject that the two-dimensional composition setting unit 113 uses. In other words, the three-dimensional composition setting unit 114 sets composition based on the second technique different from the first technique that the two-dimensional composition setting unit 113 uses. Thus, the composition set by the three-dimensional composition setting unit 114 can be different from that set by the two-dimensional composition setting unit 113.

As will be described in detail, when the size of the trimmed region is adjusted so that another subject in the periphery of the subject that serves as a reference of composition setting is included, for example, the three-dimensional composition setting unit 114 may exclude the other subject showing a difference in depth with the main subject. In addition, the three-dimensional composition setting unit 114 may adjust the size of the trimmed region so that a region having different depths is included. Furthermore, the three-dimensional composition setting unit 114 may set symmetric composition such as halves composition, or radial composition.

Note that, as will be described below, a trimmed region set by the three-dimensional composition setting unit 114 may be applied to the two-dimensional input image. For example, trimmed regions are set by both of the two-dimensional composition setting unit 113 and the three-dimensional composition setting unit 114, and then two kinds of trimmed images may be generated from an input image. In addition, which of the two-dimensional composition setting unit 113 and the three-dimensional composition setting unit 114 will be used may be selected according to manipulation of a user.

When the set trimmed region exceeds the range of the input image, the two-dimensional composition setting unit 113 and the three-dimensional composition setting unit 114 may re-set a trimmed region by changing setting conditions. The reset process may be repeated until the trimmed image falls within the range of the input image.

Note that, in the present specification, an overall state of placement of subjects in an image is called "composition." In the example described above, "composition" is defined by a type of composition (for example, thirds composition or halves composition), a relative size of a subject to a trimmed region, a point at which a subject should be placed (for example, one of four intersections at which a subject should be placed in thirds composition), and the size of the trimmed region.

The trimming unit 115 generates a trimmed image of the trimmed region set by the two-dimensional composition setting unit 113 or the three-dimensional composition setting unit 114 from the input image. At this time, the trimming unit 115 may increase the size of the trimmed image to the size of the input image through a process of, for example, raising resolution through pixel interpolation (which is also called a super-resolution process). The two-dimensional composition setting unit 113 and the three-dimensional composition setting unit 114 may use the fact that the image can be enlarged to the size of the input image through the enlargement process as a condition for repetition of a composition re-set process.

Furthermore, the trimming unit 115 may adjust depth information set for the trimmed image. Since the trimmed image is obtained by cropping a part of the input image out, there are cases in which a depth is limited to a confined range. Thus, the trimming unit 115 adjusts depth information of the trimmed image so that distribution of depths within the trimmed image is favorably balanced based on the depth information of the input image. For example, the trimming unit 115 may adjust the depth information by adjusting parallax between a left-eye image and a right-eye image generated from the input image as trimmed images.

In addition, the trimming unit 115 may adjust the depth information set for the trimmed image according to the scene of the trimmed image or a state of the subject. When, for example, the subject is captured to appear large in the trimmed image, the trimming unit 115 may set little parallax so that the subject does not jump out of the image. In addition, the trimming unit 115 may strengthen parallax in the case of micro-photographing, or lessen parallax in the case of landscape photographing.

The recording control unit 116 records the trimmed image generated by the trimming unit 115 in the storage unit 130 as image data. The recording control unit 116 may record image data of the input image together with the trimmed image.

The display control unit 117 causes the image recorded as the image data in the storage unit 130 to be displayed on the display unit 120. After imaging is executed by the digital still camera 100, for example, the display control unit 117 may cause the image to be displayed as a preview image, or cause an arbitrary image recorded in the storage unit 130 to be displayed as a reproduction image according to manipulation of the user.

The display unit 120 is configured as, for example, an LCD (Liquid Crystal Display), an organic EL (Electro-Luminescence) display, or the like. The display unit 120 displays various kinds of information relating to the digital still camera 100 for the user under control of the display control unit 117.

Various kinds of data relating to processes of the digital still camera 100 are saved in the storage unit 130. The storage unit 130 can be, for example, a semiconductor memory such as a flash ROM (Read Only Memory) or a DRAM (Dynamic Random Access Memory), an optical disc such as a DVD (Digital Versatile Disc) or a CD (Compact Disc), a hard disk, or the like. The storage unit 130 may be a storage device installed in the digital still camera 100 or a recording medium attachable to and detachable from the digital still camera 100. In addition, the storage unit 130 may include a plurality of kinds of storage devices or recording media. In the storage unit 130, not only can image data of the input image and trimmed image be saved by the recording control unit 116, but a program or the like for causing the CPU of the control circuit 110 to realize the functions described above can also be saved.

(1-2. Process Flow)
(Entire Flow)

Figure 2:
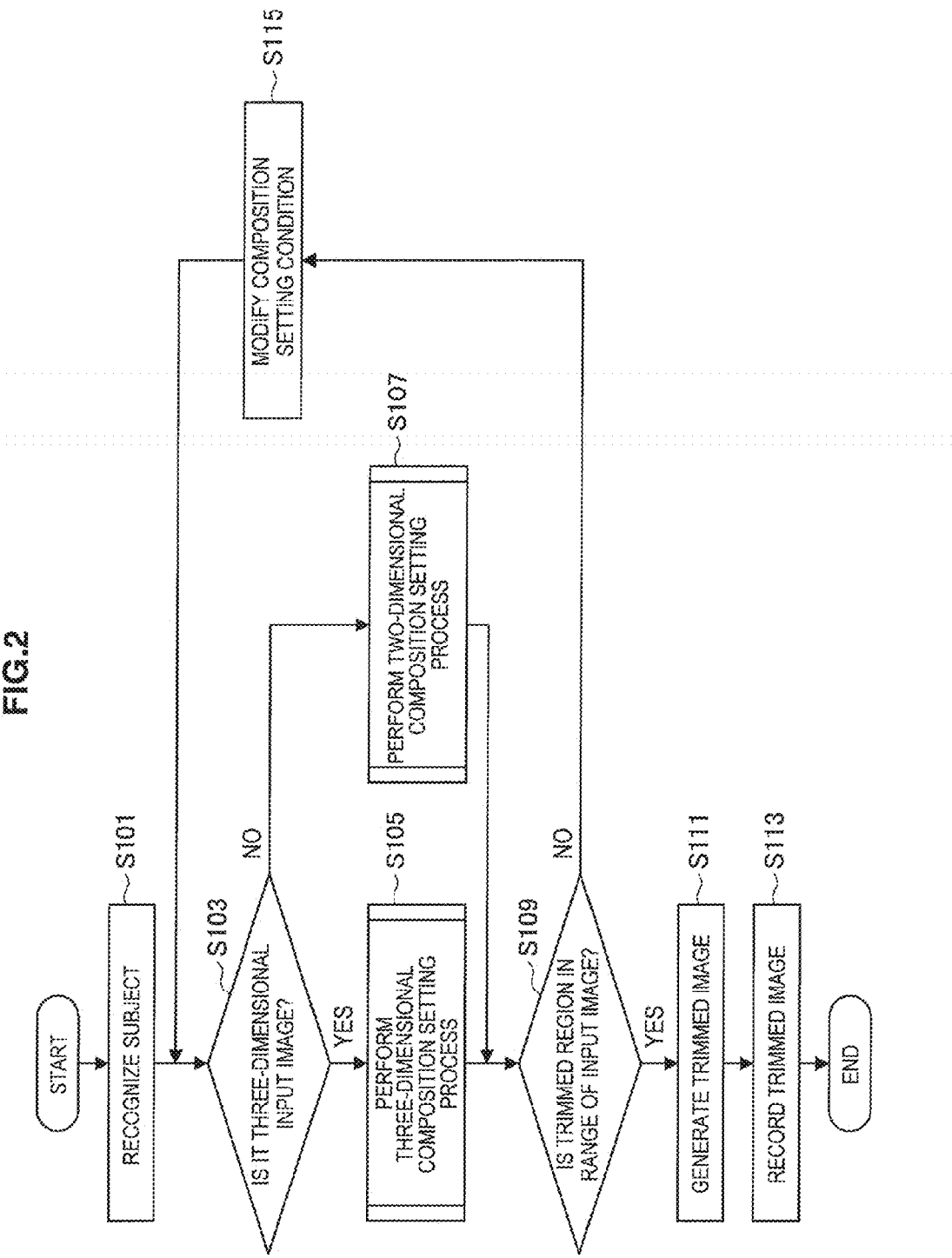
FIG. 2 is a flowchart showing a process of the digital still camera according to the first embodiment of the present disclosure.

Next, a process flow of the digital still camera according to the first embodiment of the present disclosure will be described with reference to FIG. 2. FIG. 2 is a flowchart showing a process of the digital still camera 100.

In the illustrated process, first, the subject recognition unit 111 analyzes a digital image signal of an input image acquired from the imaging unit 102 to recognize a subject included in the input image (Step S101).

Next, the image determination unit 112 determines whether or not the input image is a three-dimensional input image (Step S103). When, for example, the image is accompanied with depth information, the image determination unit 112 determines that the input image is a three-dimensional input image. As described above, the depth information referred to herein is information indicating a depth of an input image. Specifically, the depth information can be a right-eye image corresponding to a left-eye image (of which parallax represents a depth), or data or the like in which a depth of an image is expressed using a map, a numeric value, or the like. Alternatively, the image determination unit 112 may execute the same determination based on an operation mode set in the digital still camera 100.

In Step S103, when the input image is determined to be a three-dimensional input image, the three-dimensional composition setting unit 114 executes a three-dimensional composition setting process (Step S105) to set a trimmed region of the input image. On the other hand, when the input image is determined not to be a three-dimensional input image, in other words, determined to be a two-dimensional input image, the two-dimensional composition setting unit 113 executes a two-dimensional composition setting process (Step S107) to set a trimmed region of the input image. As described above, in the composition setting processes of Steps S105 and S107, information of the subject recognized in Step S101 can be used. Note that details of the three-dimensional and two-dimensional composition setting processes will be described in detail later.

Next, the three-dimensional composition setting unit 114 or the two-dimensional composition setting unit 113 determines whether or not the trimmed region has been set in the range of the input image (Step S109). Here, when the trimmed region is determined to have been set in the range of the input image, the trimming unit 115 generates a trimmed image from the input image according to the set trimmed region (Step S111), and the recording control unit 116 causes the trimmed image to be recorded in the storage unit 130 (Step S113).

On the other hand, when the trimmed region is determined not to have been set in the range of the input image in Step S109, the three-dimensional composition setting unit 114 or the two-dimensional composition setting unit 113 modifies a composition setting condition (Step S115), and then executes the composition setting process again from Step S103.

In this case, which of the three-dimensional composition setting process (Step S105) and the two-dimensional composition setting process (Step S107) should be executed is basically the same as in the first round of the process. However, when the trimmed region has not been set in the range of the input image in the two-dimensional composition setting process (Step S107), for example, the three-dimensional composition setting process (Step S105) may be executed in the next round, or the converse may be possible. In other words, which of the two-dimensional and the three-dimensional composition setting processes should be used may be included in the composition setting condition changed in Step S115.

(1-3. Example of the Three-Dimensional Composition Setting Process)

Figure 3:
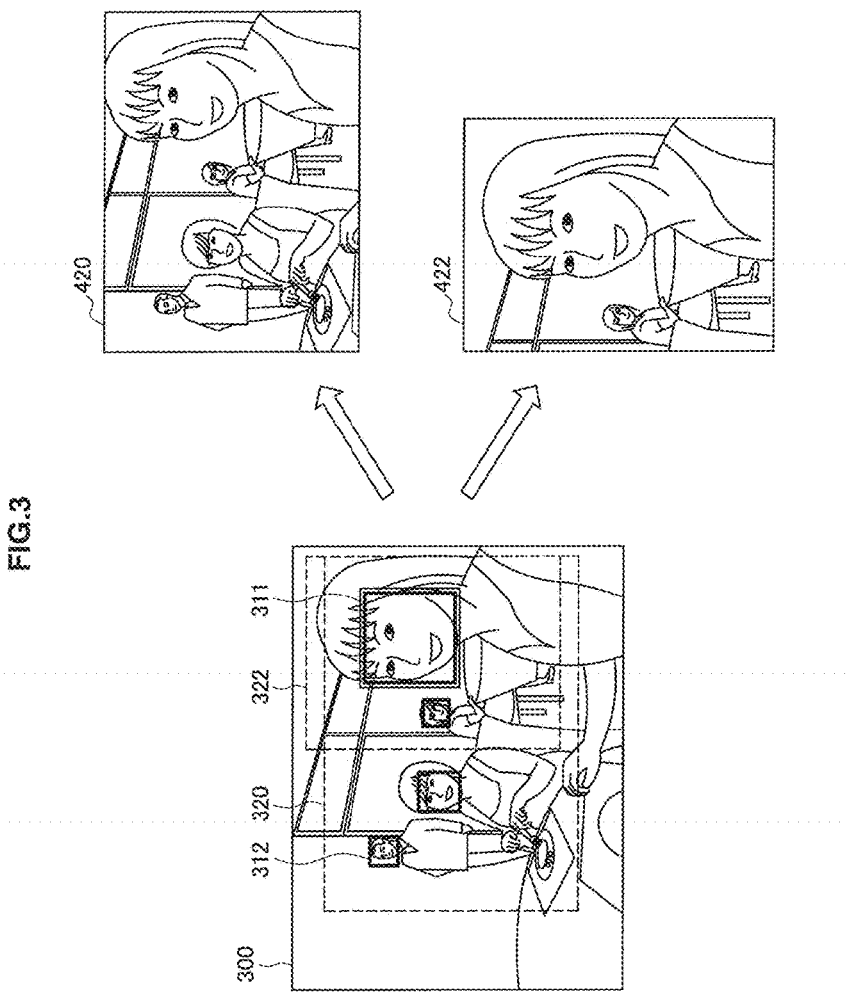
FIG. 3 is a diagram for schematically showing two-dimensional and three-dimensional composition setting processes according to the first embodiment of the present disclosure.
Figure 4:
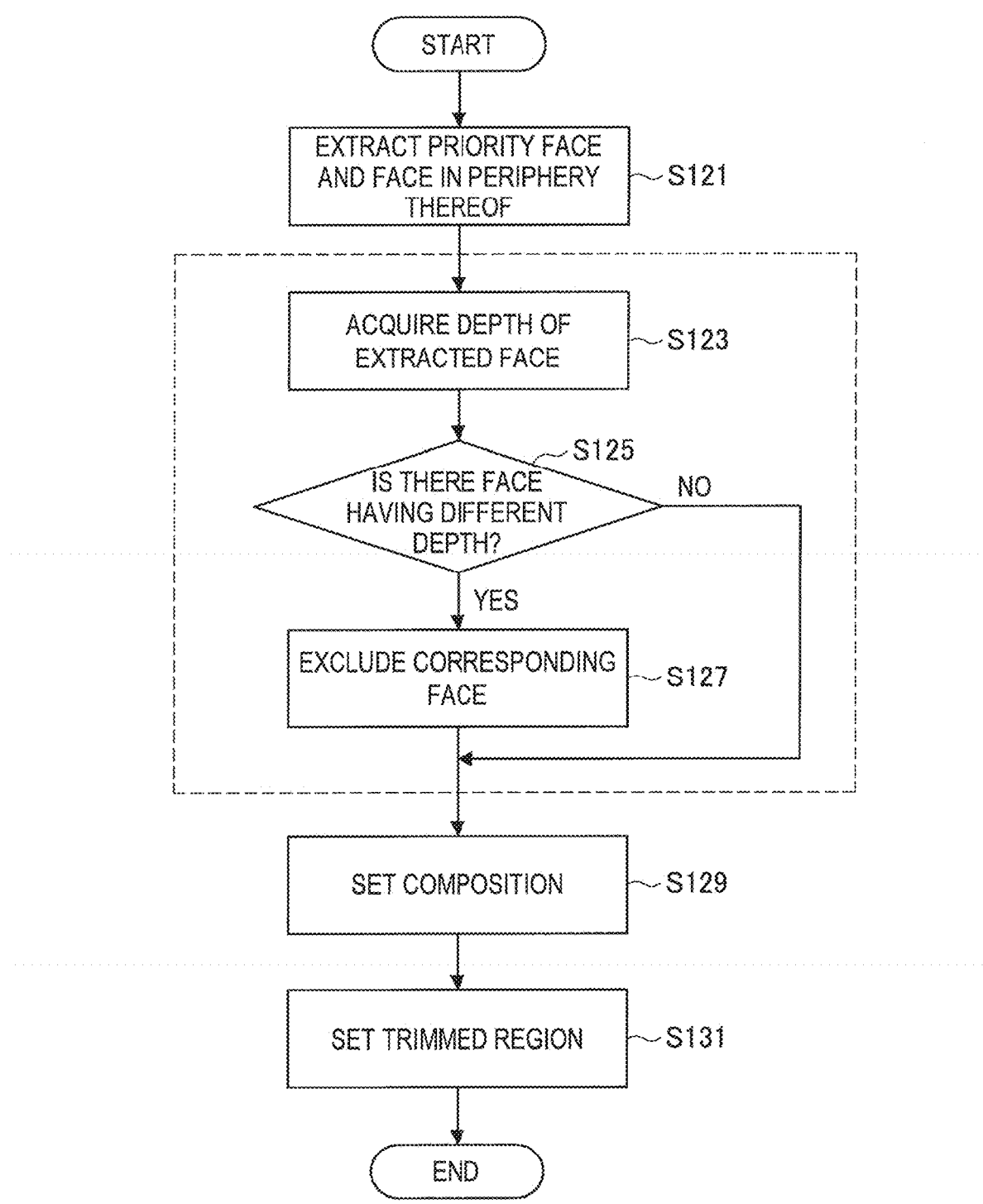
FIG. 4 is a flowchart of a process performed by a three-dimensional composition setting unit according to the first embodiment of the present disclosure.

Next, the three-dimensional composition setting process according to the first embodiment of the present disclosure will be described with reference to FIGS. 3 and 4. FIG. 3 is a diagram for schematically showing the two-dimensional and three-dimensional composition setting processes according to the present embodiment. FIG. 4 is a flowchart showing a process performed by the three-dimensional composition setting unit.

In FIG. 3, an input image 300, a trimmed image 420 trimmed using the two-dimensional composition setting process, and a trimmed image 422 trimmed using the three-dimensional composition setting process are shown.

The input image 300 includes a priority face 311 and other faces 312. In the illustrated example, the subject recognition unit 111 detects the faces of persons as subjects. The priority face 311 is, for example, a face presumed to have highest priority for a user among the faces included in the image. In composition setting, the priority face 311 is used as a referential main subject. On the other hand, the other faces 312 are faces detected by the subject recognition unit 111 other than the priority face 311.

As described above, the size of a trimmed region set according to composition can be adjusted so that another subject in the periphery of a main subject is included. In the illustrated example, the other faces 312 correspond to the other peripheral subjects. However, while all of the other faces 312 are in the periphery of the priority face 311 in terms of planar distances on the image, they are positioned more inward than the priority face 311 in terms of a depth of the actual space.

When the two-dimensional composition setting unit 113 executes the composition setting process on the input image as described above, a trimmed region 320 is set. The trimmed region 320 is set with reference to the priority face 311. Furthermore, the trimmed region 320 is adjusted so that the other faces 312 in the periphery of the priority face 311 are included.

On the other hand, when the three-dimensional composition setting unit 114 executes the composition setting process, a trimmed region 322 is set. The trimmed region 322 is also set with reference to the priority face 311. However, the trimmed region 322 is not adjusted such that the other faces 312 in the periphery of the priority face 311 are included therein. This is because there is a significant difference in depths between the priority face 311 and the other faces 312. As a result, the trimmed region 322 is set to be smaller than the trimmed region 320 and to be vertically long while the trimmed region 320 is horizontally long.

Note that, when the other faces 312 positioned in the periphery of the priority face 311 having a small difference in depths are included in the input image 300, the three-dimensional composition setting unit 114 may adjust the trimmed region 322 so that the other faces 312 are included therein. In this manner, the two-dimensional composition setting unit 113 and the three-dimensional composition setting unit 114 can set trimmed regions through different processes in the present embodiment.

In general, the other faces 312 in the periphery of the priority face 311 can be, for example, faces of those with some relation to the priority face 311, such as the faces of persons photographed together with the person of the priority face 311. For this reason, the trimmed region 320 can be adjusted so as to include the other faces 312 in the periphery of the priority face 311. However, since the priority face 311 and the other faces 312 actually have different depths as in the illustrated example, the person with the priority face 311 may have nothing to do with the persons of the other faces 312.

When the image is two-dimensionally displayed, an observer rarely perceives discomfort from the image even when the other faces 312 are included in a trimmed image. This is because the distance between subjects is perceived mainly through the planar distance on the image in two-dimensional display of the image. Thus, if the planar distance between the priority face 311 and the other faces 312 on the image is close, composition thereof does not feel unnatural.

On the other hand, when the image is three-dimensionally displayed, an observer easily perceives discomfort from the image when the other faces 312 are included therein as described above. This is because the distance between the subjects is perceived based on depths in addition to the planar distance on the image in three-dimensional display of the image. Thus, if the priority face 311 and the other faces 312 have different depths despite having a close planar distance on the image, there can be cases in which the other faces 312 feel unnatural in the composition, and as a result, the composition feels unnatural.

Therefore, in the present embodiment, the composition setting process is executed for a three-dimensional input image in consideration of three-dimensional display as described above, thereby realizing generation of a more appropriate trimmed image.

Note that, in the illustrated example, the trimmed region 322 is not adjusted so that the other faces 312 in the periphery of the priority face 311 are included therein, but consequently, some of the other face 312 are included in the trimmed region 322. As described above, "excluding a face as a target of composition setting" in the composition setting process of the present embodiment does not necessarily mean "not including the face in a trimmed region."

(Process Flow)

Referring to FIG. 4, as the process of the three-dimensional composition setting unit 114 in the present embodiment, the priority face 311 and the other faces 312 in the periphery thereof are first extracted (Step S121). Here, the other faces 312 are extracted as candidates of subjects to be included in the trimmed region 322 set with reference to the priority face 311.

Next, depths of the extracted priority face 311 and the other faces 312 are acquired (Step S123). The depths of faces can be acquired using, for example, depth information accompanying the input image. For example, when a left-eye image and a right-eye image are acquired as input images, by extracting parallax in regions of the faces from the images, the depths can be acquired.

Next, it is determined whether or not there is a face having a different depth from the priority face 311 among the other faces 312 (Step S125). Here, a threshold value of the difference in the depths at which they are determined to be different is set based on, for example, a characteristic of human vision when three-dimensionally displayed images are observed. The threshold value may be a value varying with, for example, the depth of the priority face 311.

In Step S125, when it is determined that there is a face having a different depth from the priority face 311 among the other faces 312, the corresponding face 312 is excluded as a candidates for a subject included in composition (Step S127). In the example of FIG. 3 described above, all of the other faces 312 are excluded.

Next, the composition is set with reference to the priority face 311 (Step S129), and a trimmed region is set according to the composition (Step S131). At this time, the size of the trimmed region can be adjusted so that the remaining faces 312 which have not been excluded in Step S127 are included therein.

Note that, in the present embodiment, the two-dimensional composition setting unit 113 executes the processes described with reference to FIG. 4 above except for those of Steps S123 to S127. In other words, in the three-dimensional composition setting process of the present embodiment, the selection process of the other faces 312 shown in Steps S123 to S127 is added to the two-dimensional composition setting process.

In the first embodiment of the present disclosure described above, for example, as the selection process of a subject to be included in the trimmed region is performed differently in the two-dimensional input image and the three-dimensional input image, a trimmed image that only includes a more appropriate subject is generated for the three-dimensional input image.

2. Second Embodiment

Figure 6:
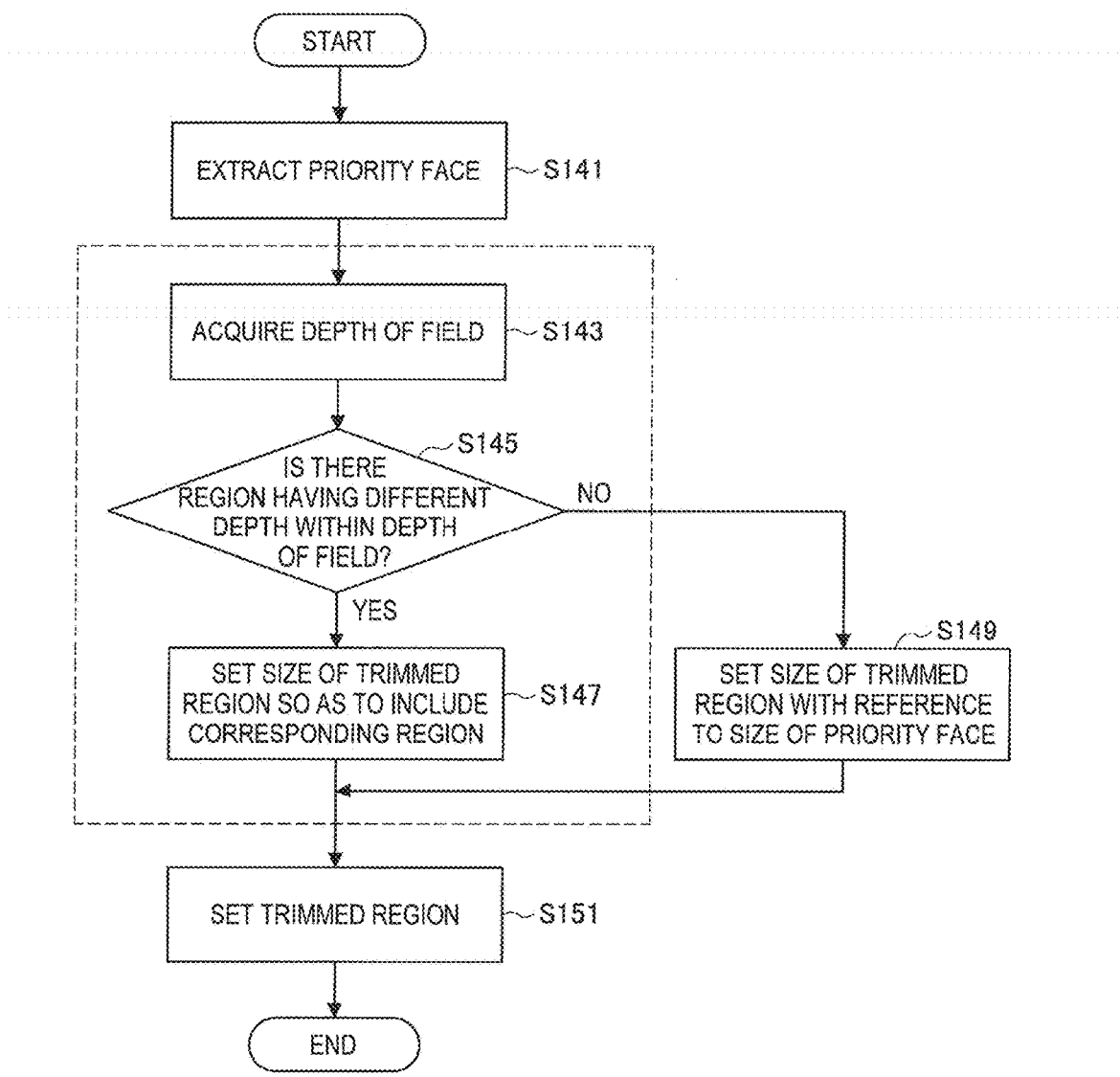
FIG. 6 is a flowchart of a process performed by the three-dimensional composition setting unit according to the second embodiment of the present disclosure.

Next, a second embodiment of the present disclosure will be described with reference to FIGS. 5 and 6. FIG. 5 is a diagram for schematically describing two-dimensional and three-dimensional composition setting processes according to the present embodiment. FIG. 6 is a flowchart of a process performed by the three-dimensional composition setting unit.

Note that, in the second embodiment, since the composition setting process is different from that of the first embodiment described above, that process will be described in detail below. On the other hand, since configurations other than that process are the same as those of the first embodiment, detailed description thereof will be omitted.

FIG. 5 shows an input image 300, a trimmed image 420 trimmed using a two-dimensional composition setting process, and a trimmed image 422 trimmed using a three-dimensional composition setting process.

A priority face 311 is included in the input image 300. In addition, the input image 300 includes a front region 332 that includes the priority face 311 (a region with a small depth), and an inner region 334 (a region with a larger depth) which corresponds to a background.

When the two-dimensional composition setting unit 113 executes a composition setting process on the input image described above, a trimmed region 320 is set. The trimmed region 320 is set based on the priority face 311, and a size thereof is a predetermined size based on, for example, the size of the priority face 311.

On the other hand, when the three-dimensional composition setting unit 114 executes a composition setting process, a trimmed region 322 is set. The trimmed region 322 is also set based on the priority face 311. However, the trimmed region 322 is set so as to include the inner region 334 in addition to the front region 332 including the priority face 311. As a result, the trimmed region 322 is set to be greater than a trimmed region 320 and to be horizontally long while the trimmed region 320 is vertically long. In this manner, the two-dimensional composition setting unit 113 and the three-dimensional composition setting unit 114 can set the trimmed regions through the different processes.

When an image is three-dimensionally displayed, if a range of depths in the image is narrow, an observer hardly perceives a stereoscopic effect. In other words, there is no difference from two-dimensional display in terms of an impression of the image. On the other hand, if a range of depths in the image is wide, an observer easily perceives a stereoscopic effect. In other words, such an impression of the image is only possible in three-dimensional display.

Therefore, in the present embodiment, the composition setting process is executed on the three-dimensional input image in consideration of three-dimensional display, thereby realizing generation of a more appropriate trimmed image.

(Process Flow)

Referring to FIG. 6, as a process of the three-dimensional composition setting unit 114 in the present embodiment, the priority face 311 is first extracted (Step S141). Next, information of a depth of field of an input image is acquired (Step S143). A depth of field among depths of an input image indicates a range on which the imaging optical system 101 focuses. The information of the depth of field is computed based on, for example, setting of the imaging optical system 101 during imaging, and attached to the input image as numerical data indicating a range.

Next, it is determined whether or not there is a region of which a depth is different from the priority face 311 in the region within the depth of field in the input image (Step S145). Here, a threshold value for determining a different depth is set based on, for example, a characteristic of human vision when three-dimensionally displayed images are observed. The threshold value may be a value varying with, for example, the depth of the priority face 311.

In Step S145, when it is determined that there is a region having a different depth, a size of the trimmed region 322 is set so as to include the corresponding region (Step S147). Here, the size of the trimmed region 322 can be set such that, for example, an area ratio of the front region 332 to the inner region 334 included in the trimmed region 322 is a predetermined value. The predetermined value can be set, for example, based on the characteristic of human vision when three-dimensionally displayed images are observed. As an example, an area ratio of the front region 332 to the inner region 334 included in the trimmed region 322 can be set to 1:2, 1:3, or the like.

Note that, as shown in Step S145, the inner region 334 is included in the trimmed region 322 in the present embodiment when the depth of the inner region 334 is included in the range of the depth of field. This is because a user may feel discomfort when an image that includes a region which is not in the range of the depth of field, i.e., which is not focused, is three-dimensionally displayed.

On the other hand, in Step S145, when it is determined that there is no region having a different depth, the size of the trimmed region 322 is set with reference to the priority face 311 (Step S149). Such setting of the size of the trimmed region 322 is the same as in the two-dimensional composition setting process.

Next, the trimmed region is set in the size set in Step S147 or Step S149 (Step S151).

Note that, in the present embodiment, the two-dimensional composition setting unit 113 executes the processes described with reference to FIG. 6 above except for those of Steps S143 to S147. In other words, in the three-dimensional composition setting process of the present embodiment, the size setting process shown in Steps S143 to S147 is added to the two-dimensional composition setting process.

In the second embodiment of the present disclosure described above, for example, by performing setting of the size of the trimmed region differently for a two-dimensional input image and a three-dimensional input image, a trimmed image giving a user an impression that is only possible in a three-dimensional image is generated from the three-dimensional input image.

3. Third Embodiment

Figure 7:
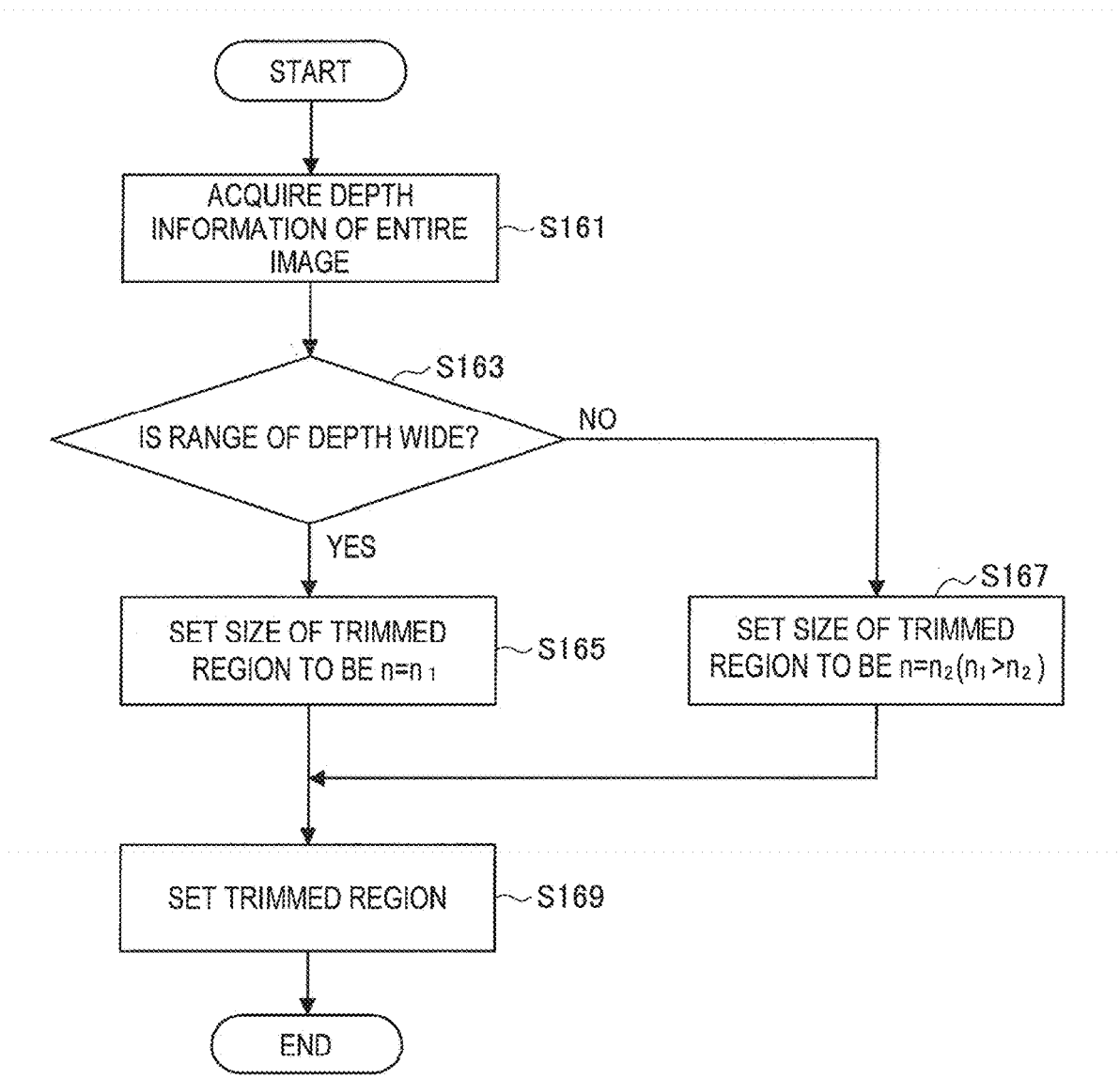
FIG. 7 is a flowchart of a process performed by a three-dimensional composition setting unit according to a third embodiment of the present disclosure.

Next, a third embodiment of the present disclosure will be described with reference to FIG. 7. FIG. 7 is a flowchart of a process performed by a three-dimensional composition setting unit in the present embodiment.

Note that, since the composition setting process of the third embodiment is different from the first embodiment described above, that process will be described in detail below. On the other hand, since other configurations are the same as those of the first embodiment, detailed description thereof will be omitted. In addition, since a trimmed image generated as a result of two-dimensional and three-dimensional composition setting processes in the present embodiment is substantially the same as that in the example of FIG. 5 described above, FIG. 5 will be continuously referred to in the present embodiment.

Referring to FIG. 7, as a process of the three-dimensional composition setting unit 114 of the present embodiment, depth information of an entire image is first acquired (Step S161). When, for example, a left-eye image and a right-eye image are acquired as input images, the depth information of the entire image can be acquired by extracting parallax distribution of the entire image from the images.

Next, it is determined whether or not a range of depths of the image is wide (Step S163). Here, a threshold value for determining a wide range of depths is set based on, for example, the characteristic of human vision when three-dimensionally displayed images are observed. The threshold value may be a value varying with, for example, the depth of a portion located in a foremost position in the image.

In Step S163, when the range of the depths is determined to be wide, a size of a trimmed region is set to $n=n_1$ (Step S165). Note that, in the present embodiment, the size of the trimmed region is set to n times the size of the priority face 311 ($n \geq 1$). In Step S165, the value of n is set to the first predetermined value $n_1$.

On the other hand, in Step S163, when the range of the depths is determined not to be wide, the size of the trimmed region is set to $n=n_2$ (Step S167). Here, the second predetermined value $n_2$ is a value that satisfies $n_1 > n_2$. In other words, in the present embodiment, when the range of the depths is wider, a coefficient for setting the size of the trimmed region according to the ratio of the size of the priority face 311 is set to be higher than when the range of the depths is narrower. In other words, when the size of the priority face 311 is the same, if the range of the depths of the image is wider, the size of the trimmed region increases.

Next, the trimmed region is set to the size set in Step S165 or Step S167 (Step S169).

In the third embodiment of the present disclosure described above, for example, when the depth information of the image has a width equal to or greater than a predetermined threshold value, further zoomed-out composition can be set as in the trimmed image 422 of FIG. 5. On the other hand, when the depth information of the image only has a width less than the predetermined threshold value, further zoomed-in composition can be set. Accordingly, a trimmed image that includes a portion giving a stereoscopic effect (portion having a different depth) included in the input images can be generated, giving a user an impression that is only possible in three-dimensional display.

4. Fourth Embodiment

Figure 8:
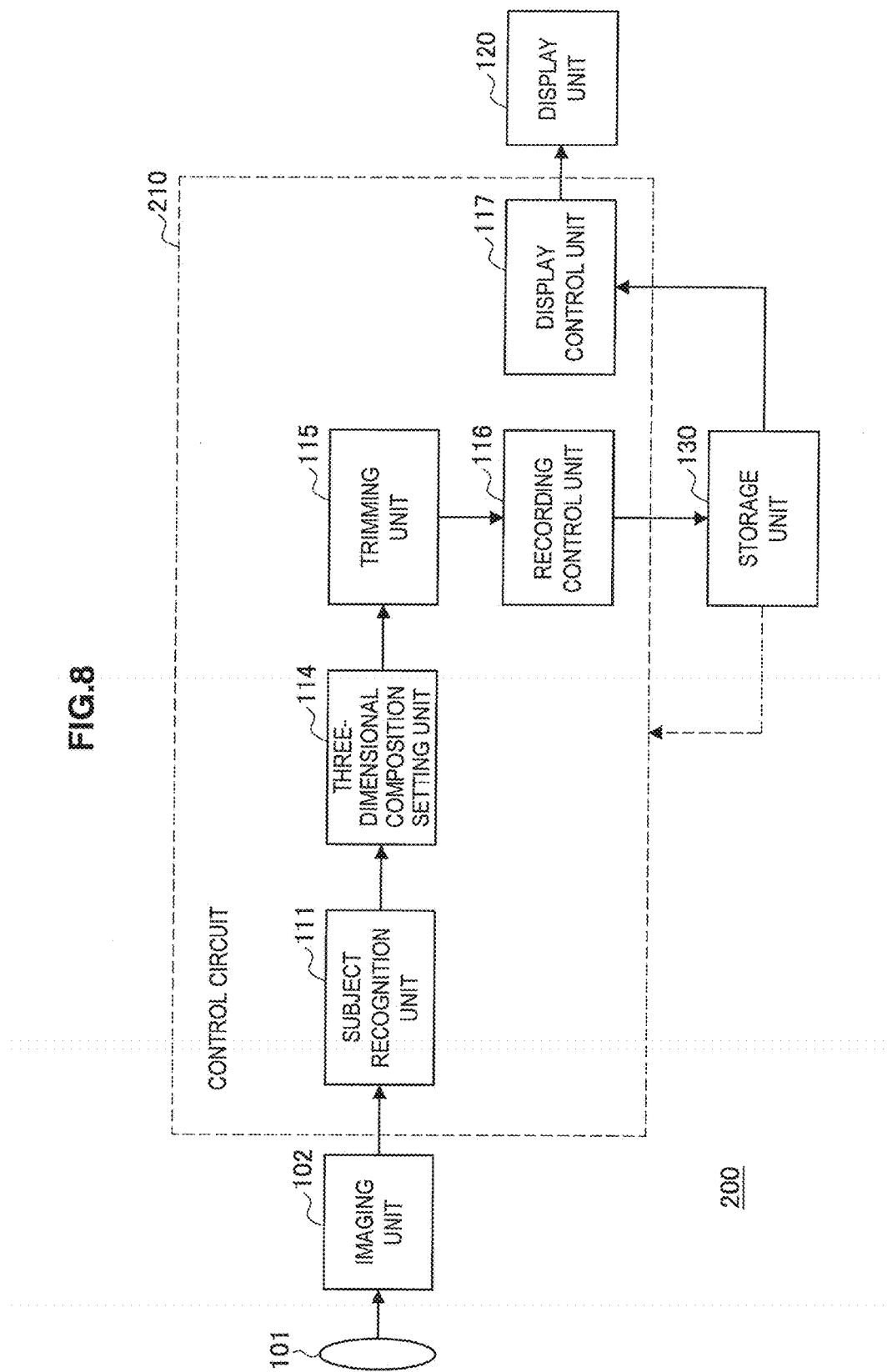
FIG. 8 is a schematic block diagram showing a functional configuration of a digital still camera according to a fourth embodiment of the present disclosure.

Next, a fourth embodiment of the present disclosure will be described with reference to FIG. 8. FIG. 8 is a schematic block diagram showing a functional configuration of a digital still camera 200 according to the present embodiment.

Note that, in the fourth embodiment, since the digital still camera 200 is different from that of the first embodiment in that the digital still camera sets composition only using the three-dimensional composition setting unit 114, detailed description thereof will be provided below. On the other hand, since other configurations are the same as those of the first embodiment, detailed description thereof will be omitted. Note that, in a composition setting process, the same process as in the second and the third embodiments may be executed.

Referring to FIG. 8, the digital still camera 200 according to the present embodiment is different from the digital still camera 100 according to the first embodiment in that the digital still camera 200 does not include the image determination unit 112 and the two-dimensional composition setting unit 113. In the present embodiment, the imaging unit 102 normally outputs an input image having depth information. For this reason, composition setting for generating a trimmed image is executed only by the three-dimensional composition setting unit 114.

However, in the digital still camera 200, a trimmed image may not be recorded as a three-dimensional image at all times. As described above, a trimmed region set by the three-dimensional composition setting unit 114 can be applied to trimming of a two-dimensional image. Thus, in the present embodiment, the trimming unit 115 may generate a trimmed image as a two-dimensional image according to the trimmed region set by the three-dimensional composition setting unit 114. Whether the trimming unit 115 generates a three-dimensional trimmed image or a two-dimensional trimmed image is decided in, for example, an operation mode set in the digital still camera 200.

5. Supplement

Note that the embodiments of the present disclosure can be variously modified as shown in an example thereof below, in addition to those described above.

For example, the image processing device according to the embodiments of the present disclosure is not limited to a digital still camera, and may be a mobile terminal such as a mobile telephone (smartphone) or a tablet PC (Personal Computer) with an imaging function. In addition, the image processing device may be an information processing device such as a desktop PC that does not have an imaging function. In this case, the image processing device acquires an image captured using, for example, another device as an input image.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

Additionally, the present technology may also be configured as below.

(1)

An image processing device including:

a first composition setting unit configured to set composition for a two-dimensionally displayed input image based on a first technique; and a second composition setting unit configured to set composition for a three-dimensionally displayed input image based on a second technique different from the first technique.

(2)

The image processing device according to (1), wherein the second composition setting unit sets composition based on depth information indicating a depth of the three-dimensionally displayed input image.

(3)

The image processing device according to (2), wherein the second composition setting unit sets composition in which a first subject included in the three-dimensionally displayed input image is placed, and according to the composition, sets a trimmed region of the three-dimensionally displayed input image so that, among second subjects positioned in the periphery of the first subject in the input image, a subject having a small difference in depth with the first subject is included therein.

(4)

The image processing device according to (2) or (3), wherein the second composition setting unit sets a trimmed region of the three-dimensionally displayed input image so that a first region having a smaller depth and a second region having a larger depth in the three-dimensionally displayed input image are included therein according to the composition set based on the second technique.

(5)

The image processing device according to (4), wherein the second composition setting unit causes the second region to be included in the trimmed region when a depth of the second region is included in a range of a depth of field of the three-dimensionally displayed input image.

(6)

The image processing device according to (4) or (5), wherein the second composition setting unit sets the trimmed region so that a ratio of the first region to the second region to be included in the trimmed region is a predetermined value.

(7)

The image processing device according to any one of (2) to (6), wherein the second composition setting unit sets a trimmed region of the three-dimensionally displayed input image according to the composition set based on the second technique, and sets the trimmed region to be larger when a range of depths of the three-dimensionally displayed input image is equal to or higher than a predetermined range.

(8)

The image processing device according to any one of (1) to (7), wherein the second composition setting unit sets composition based on information indicating a depth of field of the input image.

(9)

The image processing device according to any one of (1) to (8), wherein the second composition setting unit sets composition in which a subject included in the input image is placed.

(10)

The image processing device according to any one of (1) to (9), wherein the second composition setting unit sets symmetric composition.

(11)

The image processing device according to any one of (1) to (10), further including:

a trimming unit configured to generate a trimmed image of a trimmed region set according to the composition set based on the second technique from the three-dimensionally displayed input image and to adjust a depth set for the trimmed image based on depth information indicating a depth of the three-dimensionally displayed input image.

(12)

The image processing device according to any one of (1) to (11), further including:

an image determination unit configured to determine the two-dimensionally displayed input image and the three-dimensionally displayed input image.

(13)

An image processing method including:

setting composition for a two-dimensionally displayed input image based on a first technique; and setting composition for a three-dimensionally displayed input image based on a second technique different from the first technique.

(14)

An image processing device including:

a composition setting unit configured to set composition for a three-dimensionally displayed input image based on depth information indicating a depth of the input image.

(15)

The image processing device according to (14), wherein the composition setting unit sets composition in which a first subject included in the input image is placed, and according to the composition, sets a trimmed region of the input image so that, among second subjects positioned in the periphery of the first subject in the input image, a subject having a small difference in depth with the first subject is included therein.

(16)

The image processing device according to (15), wherein, according to the set composition, the composition setting unit sets a trimmed region of the input image so that a first region having a smaller depth and a second region having a larger depth represented by the depth information are included therein.

(17)

The image processing device according to (16), wherein, when the depth of the second region is included in a range of a depth of field of the input image, the composition setting unit causes the second region to be included in the trimmed region.

(18)

The image processing device according to (16) or (17), wherein the composition setting unit sets the trimmed region so that a ratio of the first region to the second region to be included in the trimmed region has a predetermined value.

(19)

The image processing device according to any one of (14) to (18), further including:

a trimming unit configured to generate a trimmed image of a trimmed region set according to the composition from the input image and to adjust a depth set for the trimmed image based on the depth information.

(20)

An image processing method including:

setting composition for a three-dimensionally displayed input image based on depth information indicating a depth of the input image.

REFERENCE SIGNS LIST 100, 200 digital still camera (image processing device)
102 imaging unit
111 subject recognition unit
112 image determination unit
113 two-dimensional composition setting unit
114 three-dimensional composition setting unit
115 trimming unit
116 recording control unit
117 display control unit
120 display unit
130 storage unit
300 input image
320 first trimmed region
322 second trimmed region

The invention claimed is:

1. An image processing device, comprising:
a first composition setting unit configured to set a first composition for a two-dimensional input image by a first technique based on at least a size of a first subject in an input image; and
a second composition setting unit configured to set a second composition for a three-dimensional input image by a second technique based on depth information associated with the input image and the size of the first subject in the input image,
wherein the second technique is different from the first technique.

2. The image processing device according to claim 1, wherein the depth information corresponds to a depth of the three-dimensional input image.

3. The image processing device according to claim 2, wherein the second composition setting unit is further configured to:
set the second composition to place the first subject included in the three-dimensional input image, and
set a trimmed region of the three-dimensional input image based on the set second composition, to include a second subject having a difference in depth with the first subject in the trimmed region,
wherein the second subject corresponds to at least one of second subjects positioned in a periphery of the first subject in the input image.

4. The image processing device according to claim 2, wherein the second composition setting unit is further configured to set a trimmed region of the three-dimensional input image to include a first region and a second region in the trimmed region,
wherein the first region that has a first depth and the second region that has a second depth in the three-dimensional input image are included in the trimmed region based on the set second composition, and
wherein the first depth is smaller than the second depth.

5. The image processing device according to claim 4, wherein the second composition setting unit is further configured to include the second region in the trimmed region based on the second depth included in a range of a depth of field of the three-dimensional input image.

6. The image processing device according to claim 4, wherein the second composition setting unit is further configured to set the trimmed region so that a ratio of the first region to the second region included in the trimmed region is equal to a numerical value.

7. The image processing device according to claim 2, wherein the second composition setting unit is further configured to:
set a trimmed region of the three-dimensional input image based on the set second composition, and
set the trimmed region based on a first range of depths of the three-dimensional input image,
wherein the first range of depths is equal to or higher than a second range.

8. The image processing device according to claim 1, wherein the second composition setting unit is further configured to set the second composition based on information indicating a depth of field of the input image.

9. The image processing device according to claim 1, wherein the second composition setting unit is further configured to set the second composition in which the first subject included in the input image is placed.

10. The image processing device according to claim 1, wherein the second composition setting unit is further configured to set symmetric composition, and
wherein the symmetric composition corresponds to at least one of a halves composition or a radial composition.

11. The image processing device according to claim 1, further comprising:
a trimming unit configured to:
generate a trimmed image of a trimmed region that is set based on the set second composition, from the three-dimensional input image, and
adjust a depth set for the trimmed image based on the depth information indicating a depth of the three-dimensional input image.

12. The image processing device according to claim 1, further comprising:
an image determination unit configured to determine the two-dimensional input image and the three-dimensional input image.

13. An image processing method, comprising:
setting a first composition for a two-dimensional input image by a first technique based on at least a size of a first subject in an input image; and
setting a second composition for a three-dimensional input image by a second technique based on depth information associated with the input image and the size of the first subject in the input image, wherein the second technique is different from the first technique.

14. An image processing device, comprising:
an image determination unit configured to determine an input image as a three-dimensional input image, based on depth information indicating a depth of the input image; and
a composition setting unit configured to set composition for the three-dimensional input image based on the depth information and a size of a first subject in the input image.

15. The image processing device according to claim 14, wherein the composition setting unit is further configured to:
set the composition to place the first subject included in the input image, and
set a trimmed region of the input image based on the set composition, to include a second subject having a difference in depth with the first subject in the trimmed region,
wherein the second subject corresponds to at least one of second subjects positioned in periphery of the first subject in the input image.

16. The image processing device according to claim 14, wherein, based on the set composition, the composition setting unit is further configured to set a trimmed region of the input image to include a first region and a second region in the trimmed region,
wherein the first region that has a first depth and the second region that has a second depth represented by the depth information are included in the trimmed region based on the set composition, and
wherein the first depth is smaller than the second depth.

17. The image processing device according to claim 16, wherein, based on the second depth included in a range of a depth of field of the input image, the composition setting unit is further configured to include the second region in the trimmed region.

18. The image processing device according to claim 16, wherein the composition setting unit is further configured to set the trimmed region so that a ratio of the first region to the second region included in the trimmed region is equal to a numerical value.

19. The image processing device according to claim 14, further comprising:
a trimming unit configured to:
generate a trimmed image of a trimmed region that is set based on the set composition, from the input image, and
adjust a depth set for the trimmed image based on the depth information.

20. An image processing method, comprising:
determining an input image as a three-dimensional input image, based on depth information indicating a depth of the input image; and
setting composition for the three-dimensional input image based on the depth information and a size of a first subject in the input image.

* * * * *